(12) United States Patent
Kerkmann et al.

(10) Patent No.: US 11,813,970 B2
(45) Date of Patent: Nov. 14, 2023

(54) SEATING MEANS WITH ACTUATORS FOR SOUND EMISSION

(71) Applicant: Continental Engineering Services GmbH, Frankfurt (DE)

(72) Inventors: Johannes Kerkmann, Frankfurt am Main (DE); Dimitrios Patsouras, Frankfurt am Main (DE); Philipp Neubauer, Frankfurt am Main (DE); Karsten Moritz, Frankfurt am Main (DE); Robert Joest, Frankfurt am Main (DE); Stephan Eisele, Frankfurt am Main (DE); Pascal Köhler, Frankfurt am Main (DE); Robert Wick, Frankfurt am Main (DE); Jens Friedrich, Frankfurt am Main (DE); Christian Walther, Frankfurt am Main (DE)

(73) Assignee: CONTINENTAL ENGINEERING SERVICES GMBH, Frankfurt (DE)

( * ) Notice: Subject to any disclaimer, the term of this patent is extended or adjusted under 35 U.S.C. 154(b) by 0 days.

(21) Appl. No.: 17/410,089

(22) Filed: Aug. 24, 2021

(65) Prior Publication Data
US 2022/0063467 A1    Mar. 3, 2022

(30) Foreign Application Priority Data

Sep. 2, 2020   (DE) .................... 10 2020 211 092.1
May 6, 2021   (DE) .................... 10 2021 204 590.1

(51) Int. Cl.
*A47C 7/62*   (2006.01)
*B60N 2/879*   (2018.01)
(Continued)

(52) U.S. Cl.
CPC .......... *B60N 2/879* (2018.02); *B60R 11/0217* (2013.01); *B60R 2011/0015* (2013.01); *B60R 2011/0017* (2013.01)

(58) Field of Classification Search
CPC .... H04R 5/023; H04R 2499/13; B60N 2/879; B60R 11/0217; B60R 2011/0017; A47C 1/12

See application file for complete search history.

(56) References Cited

U.S. PATENT DOCUMENTS 3,792,754 A * 2/1974 Hanson ................ H04R 5/0335
                                                            181/130
4,027,112 A * 5/1977 Heppner ................ H04R 5/023
                                                            381/301
(Continued)

FOREIGN PATENT DOCUMENTS

CN    106455823 A    2/2017
DE    69829943 T2    3/2006
(Continued)

OTHER PUBLICATIONS

German Examination Report for German Application No. 10 2021 204 590.1, dated Aug. 17, 2021, with translation, 13 pages.
(Continued)

*Primary Examiner* — Shin H Kim
(74) *Attorney, Agent, or Firm* — RatnerPrestia

(57) ABSTRACT

A sound emission arrangement, having a seat that has a backrest surface and a headrest surface, where the sound emission arrangement has at least one first and one second actuator for vibration excitation, where each of the two actuators is arranged in the seat, so that the first and the second actuator are each arranged with their excitation surface on the inner side of a covering of the headrest
(Continued)

surface or the inner side of a covering of the backrest surface at substantially the same height.

11 Claims, 3 Drawing Sheets

(51) Int. Cl.
*B60R 11/02* (2006.01)
*B60R 11/00* (2006.01)

(56) References Cited

U.S. PATENT DOCUMENTS

| | | | | |
|---|---|---|---|---|
| 4,038,499 A * | 7/1977 | Yeaple | ............ | H04R 5/023 381/301 |
| 6,681,024 B2 | 1/2004 | Klein et al. | | |
| 7,035,422 B1 * | 4/2006 | Wiener | ............ | H04R 1/025 381/301 |
| 7,159,938 B1 * | 1/2007 | Shiraishi | ............ | B60R 11/0217 297/217.4 |
| 7,334,839 B1 * | 2/2008 | Malerba | ............ | B60N 2/5628 297/217.3 |
| 7,685,661 B2 * | 3/2010 | Popilek | ............ | A47G 9/1045 5/639 |
| 7,866,747 B2 * | 1/2011 | Park | ............ | A47C 7/727 297/344.13 |
| 8,807,267 B2 * | 8/2014 | Iwata | ............ | H04R 1/025 381/345 |
| 9,826,295 B2 * | 11/2017 | Fujita | ............ | H04R 1/025 |
| 10,064,496 B2 | 9/2018 | Takada et al. | | |
| 10,271,119 B2 * | 4/2019 | Fujita | ............ | A47C 7/72 |
| 10,789,927 B2 | 9/2020 | Patsouras et al. | | |
| 2009/0154737 A1 * | 6/2009 | Ostler | ............ | A47C 7/72 381/301 |
| 2010/0148550 A1 * | 6/2010 | Kidd | ............ | B60N 2/818 381/86 |
| 2010/0176110 A1 * | 7/2010 | Ogino | ............ | B60H 1/2225 219/202 |
| 2010/0205867 A1 * | 8/2010 | Park | ............ | A47C 1/12 297/217.4 |
| 2011/0169308 A1 * | 7/2011 | Carter | ............ | B60N 2/2839 297/217.3 |
| 2014/0270322 A1 * | 9/2014 | Silverstein | ............ | B60N 2/4214 381/391 |
| 2014/0355783 A1 * | 12/2014 | Subat | ............ | B60N 2/879 381/86 |
| 2015/0201260 A1 * | 7/2015 | Oswald | ............ | B60N 2/809 381/86 |
| 2016/0159260 A1 * | 6/2016 | Subat | ............ | B29C 45/14336 29/458 |
| 2016/0255430 A1 * | 9/2016 | Fujita | ............ | B60N 2/879 381/333 |
| 2018/0035185 A1 * | 2/2018 | Fujita | ............ | A47C 7/38 |
| 2019/0184881 A1 * | 6/2019 | Kakishima | ............ | H04R 5/023 |
| 2019/0300020 A1 | 10/2019 | Alexiou et al. | | |
| 2020/0223366 A1 * | 7/2020 | Heinz | ............ | E05B 47/0002 |
| 2020/0282889 A1 * | 9/2020 | Groleau | ............ | H04R 1/28 |
| 2021/0061152 A1 * | 3/2021 | Servadio | ............ | G10K 11/178 |
| 2021/0339666 A1 * | 11/2021 | Soltner | ............ | B60N 2/879 |
| 2021/0352390 A1 * | 11/2021 | Lee | ............ | B60R 11/0223 |

FOREIGN PATENT DOCUMENTS

| | | |
|---|---|---|
| EP | 3097703 B1 | 10/2018 |
| EP | 3508374 A1 | 7/2019 |
| FR | 2900881 A1 | 11/2007 |
| JP | 200514793 A | 1/2005 |
| WO | 2018027168 A1 | 2/2018 |
| WO | 2018188963 A1 | 10/2018 |

OTHER PUBLICATIONS

European Search Report for European Application No. 21 193 689.3, dated Jan. 25, 2022, with translation, 10 pages.
European Communication pursuant to Article 94(3) for European Application No. 21 193 689.3, dated Apr. 4, 2023 with translation, 9 pages.
Chinese Office Action for Chinese Application No. 202111019650.7, dated Jul. 25, 2023 with translation, 11 pages.

* cited by examiner

SEATING MEANS WITH ACTUATORS FOR SOUND EMISSION

CROSS REFERENCE TO RELATED APPLICATIONS

This application claims priority to German Patent Application No. 10 2020 211 092.1, filed Sep. 2, 2020, and German Patent Application No. 10 2021 204 590.1, filed May 6, 2021, the contents of such applications being incorporated by reference herein.

FIELD OF THE INVENTION

The invention relates to a sound emission arrangement, having a seating means that comprises two sound generating units.

SUMMARY OF THE INVENTION

The invention is based on proposing a sound emission arrangement, having a seating means, with which improved and/or more cost-effective and/or more efficient and/or more effective sound emission can take place.

The first and the second actuator preferably each have an electric drive for converting electrical signals into mechanical deflections or mechanical vibrations, the drive having a coil through which the current of the electrical signal can flow or flows and having a permanent magnet which can be or is in electromagnetic interaction with the coil, and, furthermore, the actuator has a housing comprising an excitation surface or has a housing and an excitation surface, where the housing and/or the excitation surface can be mechanically deflected and/or mechanically excited to vibrate by the electric drive.

The electrical signals passing through the coil expediently contain the information in the sound signal to be emitted or in the useful signal, in particular in a music signal and/or voice signal.

It is preferred that the first and the second actuator are designed or configured to emit acoustic sound and/or that the first and the second actuator are formed such that the actuator excites or can excite its excitation surface and therefore a connected body to vibrate its body structure, as a result of which the body, which is at least partially surrounded by air, emits sound waves.

The sound emission arrangement is preferably configured for use in motor vehicles, in particular cars or buses, or alternatively preferably for use in aircraft or ships/boats.

The seating means is preferably configured as a vehicle seat or vehicle chair, in particular as a motor vehicle seat or aircraft seat, or alternatively preferably as a lounger.

The surface areas of the backrest surface and headrest surface and in particular of the sitting surface can preferably be configured so as to merge with one another, and therefore these surface areas are particularly preferably not clearly separated, but rather are regions which are provided for support purposes for the corresponding body parts to rest on.

The first and the second actuator and, respectively, their excitation surfaces are preferably oriented substantially in parallel or alternatively at least one of the actuators is preferably positioned in a manner angled with respect to the other actuator, in particular in the case of a curved backrest surface or headrest surface.

The excitation surface is preferably positioned directly on the covering and/or connected directly to said covering.

It is preferred that the excitation surface is positioned on the covering and/or is connected to the covering by means of a transfer element arranged between them.

It is expedient that the actuators are each arranged in a manner oriented substantially normally to the covering surface, where the covering surface is of curved configuration in particular.

The sound emission arrangement is preferably configured such that the seating means has an additional bass actuator, in particular configured for reproducing/exciting frequencies of substantially less than 200 Hz or less than 100 Hz or less than 80 Hz and this additional bass actuator is arranged on the inner side of the covering of the backrest surface or on the inner side of the covering of a sitting surface or on the seating means structure in the region of the sitting surface or backrest surface.

It is preferred that the actuators each have an open frame on their rear side which is averted from the excitation surface, said frame enclosing the actuator with a spacing and projecting beyond the rear side of said actuator and said frame being of flexible and/or deformable configuration and/or having articulated joints.

It is expedient that the frame is formed from struts and is of deformable configuration in the direction normal to the excitation surface and also is likewise of deformable configuration perpendicular to said excitation surface.

The sound emission arrangement is preferably configured such that the actuators, in particular including the frame in each case, are each mounted/loosely mounted in a flexible filler material, in particular a plastic foam, in the seating means and are each connected at the front, on sides of the excitation surface of the actuator, to the transfer element and/or to the covering.

The sound emission arrangement preferably renders possible a particularly intense and/or direct and/or three-dimensional audio experience.

The transfer element is preferably configured such that it is designed both in terms of its shape and also in terms of its mechanical vibration properties, for example in respect of its mass and/or stiffness and/or damping, such that the transfer element acts, in particular, as an impedance transducer. Therefore, improved transfer of the vibrations from the actuator to the membrane-like covering of the headrest surface and/or backrest surface takes place.

It is preferred that the frame or open frame of at least one actuator or both actuators is configured so as to ensure free movement of the actuator at the rear, wherein the stiffness of the frame is designed such that it deforms or can deform elastically and/or plastically in the event of a crash and in so doing ensures maximum occupant protection.

The advantages of the sound emission arrangement preferably consist of one or more of the following points:
  Actuator-based systems emit considerably lower frequencies than loudspeaker-based systems on account of the extensive emission of sound over the entire surface of the seat/the headrest. As a result, Active Noise Cancellation Systems (ANC) can be implemented more effectively than with conventional loudspeakers since their control algorithms to date largely have an effect at low frequencies.
  Actuator-based systems are considerably smaller and lighter than comparable loudspeaker-based systems.
  Owing to the lower expenditure on components, actuator-based sound generating systems are more cost-effective than comparable loudspeaker systems.
  Owing to the minimal distance from the ear of the person to whom sound is being emitted, said person is in the acoustic near field of the sound emission and therefore perceives the sound particularly directly and also down to very low emitted frequencies. Other vehicle occupants are in the acoustic far field owing to the greater distance, as a result of which said vehicle occupants perceive the sound considerably less intensely. In contrast to loudspeaker-based systems, the sound source in the case of actuator-based systems is considerably closer to the ear, for which reason the effect of the acoustic near field is more strongly pronounced.

Owing to the connection of the actuators to the surface of the seat/the headrest, the actuator-based sound generating system is practically invisible and—in contrast to loudspeaker-based systems—does not require any slots or perforations in the surface.

The actuators are preferably electrically connected in a hidden manner by means of laying the cables in the headrest strut, in the seating means or the seat or in the lounger.

On the covering side, the transfer element is preferably geometrically ideally matched to the contour of the covering in order to be visually hidden from the outside. From a technical aspect, the transfer element expediently serves as a mechanical impedance transducer between the actuator and the membrane-like covering in order to ensure maximally efficient transfer of the vibrations from the actuator to the covering in the form of a membrane in order to be locally emitted from the covering/membrane as airborne sound. Here, in particular, both the geometry and the material of the transfer element are selected such that the impedance matching is substantially the best possible. The modulus of elasticity of the material used can vary, in particular, in the range of between 200 N/mm$^2$ and 80 000 N/mm$^2$. The transfer element is preferably configured such that, in the region that a person is able to touch directly, the transfer element is formed to be particularly elastic and adapted to the stiffness of the adjacent materials, for example by way of a particularly thinned-out design. The thickness of the transfer element can preferably vary between 0.3 mm and 5 mm, where the thickness can expressly fluctuate over the extent of the transfer element. The transfer elements are particularly preferably thinned out at the edge regions. The transition from the thicker inner region to the thinner outer region can be implemented on the basis of linear, quadratic or exponential functions. Materials with anisotropic behavior can also be used. The surface dimensions of the transfer elements can preferably form up to 30% of the surface of the seat/the headrest that points in the direction of the person to whom sound is being emitted or in a direction in which the person is reached by way of reflection, for example at panes of glass.

The connection between the transfer element and the covering is preferably made by an adhesive connection in order to avoid an external visual change in the covering. The connection between the actuator and the transfer element can preferably be made, for example, by adhesive bonding, screwing, clamping, riveting, bracing, welding or clipping.

The frame is expediently designed to be so stiff that free movement of the actuator is always ensured under normal operating conditions. However, the frame is expediently designed to be so soft, for example owing to thinned-out predetermined bending regions, that it is compressed by means of elastic and/or plastic deformation in the event of an overload or a crash. This ensures maximum personal protection in the event of an accident.

The same height or substantially the same height of the arrangement of the actuators is preferably understood to mean the distance of each of these actuators from a base surface/plane on which the seating means is standing or from a sitting surface of the seating means. In particular, substantially the same height within the meaning of this invention is achieved when said distances of the actuators from the base surface/plane or from the sitting surface do not deviate from one another by more than 10 cm. The height of an actuator is expediently understood to mean the distance of said actuator from the base surface/plane or from the sitting surface.

REFERENCE SIGNS

1 First actuator
2 Second actuator
3 Backrest surface
4 Headrest surface
5 Same height
6 Covering
7 Transfer element
8 Additional bass actuator
9 Frame of the actuator
10 Articulated joints of the frame
11 Struts of the frame
12 Filler material
13 Sitting surface
14 Connection lines
15 Connecting area for actuator
16 Transition of the thickness of different regions of the transfer element
17 Surface of the transfer element that is matched to the contour of the covering
18 Relatively thin outer region of the transfer element
19 Frame non-deformed
20 Frame deformed
21 Arrangement of a plurality of actuators
22 Lounger
23 Flexible region of a strut
24 Stiff region of a strut

DETAILED DESCRIPTION OF THE PREFERRED EMBODIMENTS

Figure 1:
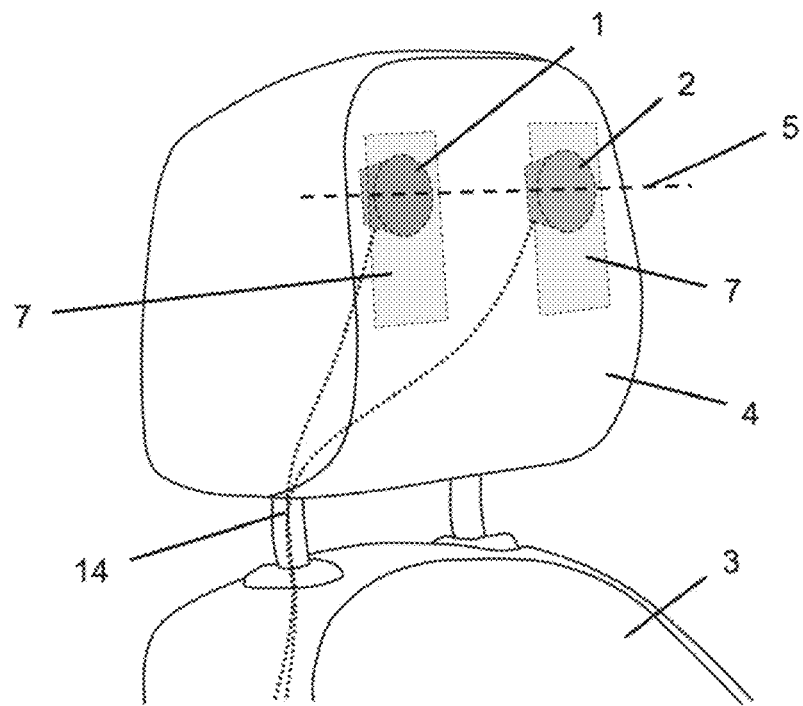
FIGS. 1 to 5 show schematic illustrations of exemplary embodiments of the sound emission arrangement or of the seating means.

FIG. 1 shows, by way of example, a headrest of a seating means with first and second actuators 1, 2 installed. The actuators 1, 2 are connected directly to the inner side of the covering of the headrest surface 4 by means of specially formed transfer elements 7. The system for generating sound or the sound emission arrangement is installed such that it is hidden from the outside. Here, the connection lines 14 are likewise routed through the struts of the headrest in a hidden manner. The first and the second actuator 1, 2 are arranged at substantially the same height 5 in the headrest or on the inner side of the covering of the headrest surface 4. The headrest surface 4 of the seating means is arranged above the backrest surface 3 of the seating means.

Figure 2:
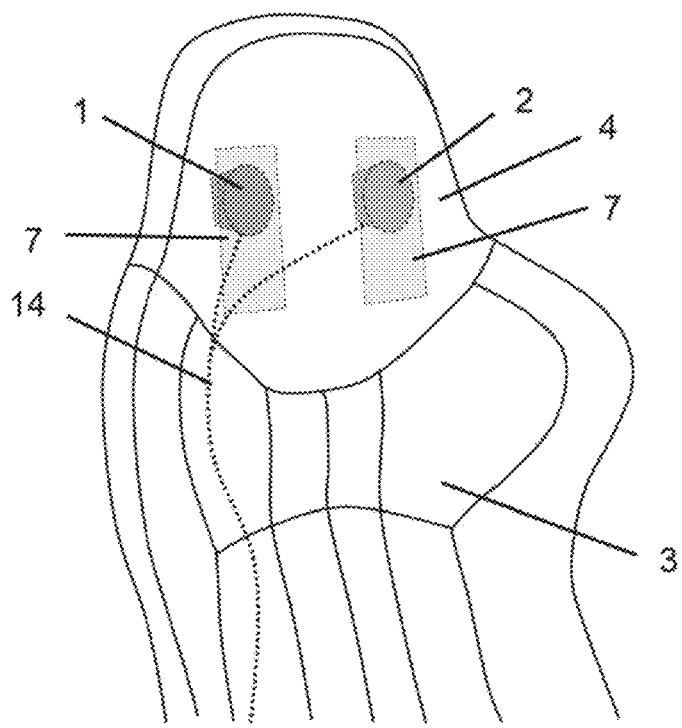

FIG. 2 depicts, according to the example, a seat shell of a chair or a vehicle seat as the seating means, with the first and the second actuator 1, 2 installed. The system for generating sound or the sound emission arrangement is installed such that it is hidden from the outside. The connection lines 14 are routed through the interior of the seat shell in a hidden manner. According to the example, the first and the second actuator 1, 2 are each connected directly to the inner side of the covering of the headrest surface 4 of the seat shell by means of transfer elements 7. The transition of the headrest surface 4 to the backrest surface 3 is made in a substantially seamless manner or in a manner merging with one another in this configuration of the seating means as a seat shell.

Figure 3:
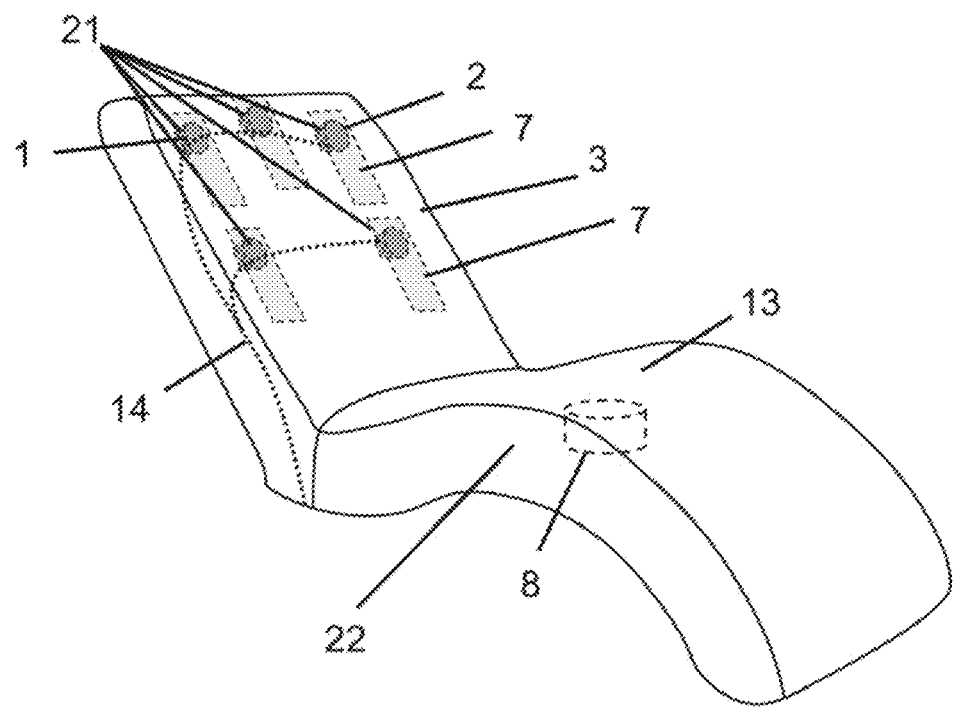

FIG. 3 illustrates, by way of example, a lounger 22 as a seating means having a plurality of installed actuators 21 in order to render possible three-dimensional sound emission, in particular in an immersive manner. The actuators 21, here comprising the first and the second actuator 1, 2, are installed in the interior of the lounger in a hidden manner and connected by elastic transfer elements 7 such that they cannot be either seen or tracked from the outside. Here, the actuators 21 are arranged behind the backrest surface 3 of the seating means. An additional bass actuator 8 is arranged behind the sitting surface 13 of the seating means as part of the exemplary sound emission arrangement.

Figure 4:
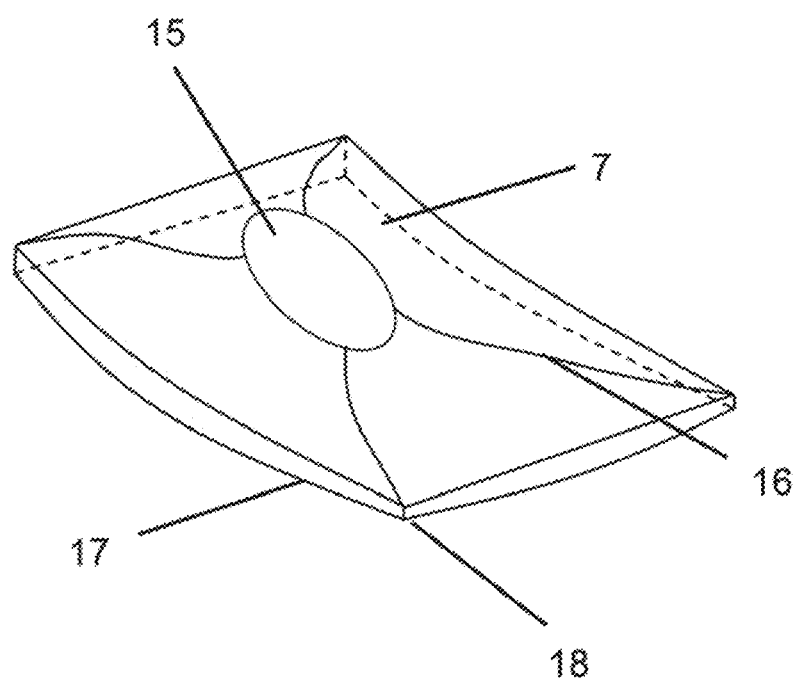

FIG. 4 illustrates an exemplary transfer element 7 for transferring the vibrations between the actuator and the membrane-like covering of a seat, a chair or a lounger or the seating means. Here, the transfer element 7 fulfils the function of an impedance transducer for ideal transfer of the vibrations. The geometry of the transfer element 7 is thinned out 18 toward its sides, with transitions 16 in the form of, by way of example, mathematical functions such as linear, quadratic or exponential functions. The transfer element 7 that is to be connected to the inner side of the covering is, at this surface, geometrically ideally matched to the contour of the covering. Material selection and thinning out of the transfer element produce a visual appearance and feel comparable to the surrounding area around the transfer element. Here, the transfer element 7 has, substantially in the center, a connecting area 15 for the actuator, where the surface 17 of the transfer element that bears against the inner side of the covering of the seating means or is connected to said inner side is matched to the contour of said covering. Here, the transfer element 7 has relatively thin outer regions 18 and relatively thick outer regions, where the transfer element 7, in terms of its geometry with respect to the transition lines 16, is accordingly configured by way of example to satisfy the mathematical functions mentioned.

Figure 5:
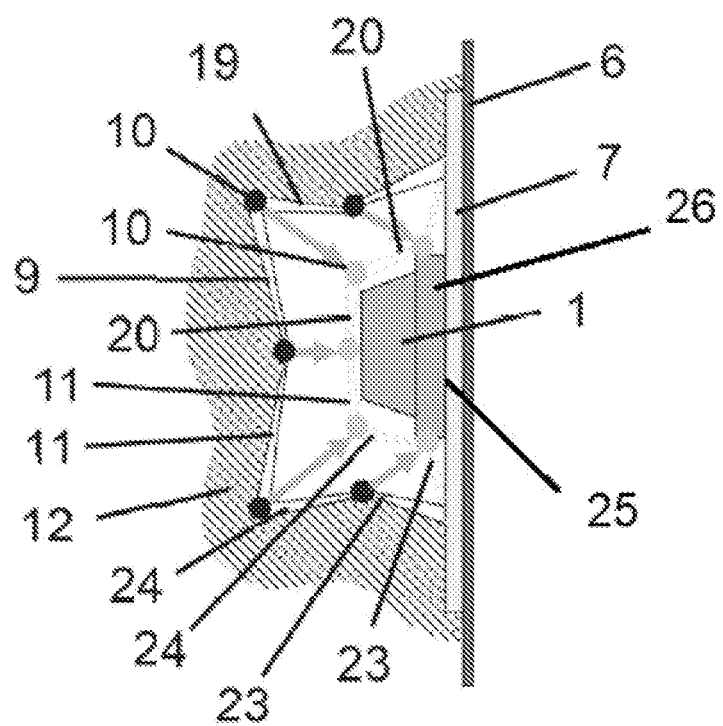

FIG. 5 shows, by way of example, a frame construction or the frame 9 for ensuring the rear-side clearance of the first actuator 1 which is connected to the covering 6 by means of the transfer element 7. The actuator 1 has a housing comprising an excitation surface 25 that can be mechanically deflected and/or mechanically excited by the electric drive to vibrate. The actuator 1 is formed such that the actuator 1 excites or can excite its excitation surface 25 and therefore a connected body 26 to vibrate its body structure, as a result of which the body, which is at least partially surrounded by air, emits sound waves.

The frame 9 has struts 11 and articulated joints 10 by means of which the struts 11 can be moved and, respectively, the frame can be deformed. Filler material 12, shown by hatching, of the headrest or of the seat or seating means is arranged behind the frame 9.

FIG. 5 illustrates a non-deformed example of the frame 19 and likewise shows a deformed or compressed illustration 20, illustrated with hatched struts. Here, the arrows show the deformation in terms of the articulated joints 10 of the non-deformed frame 19 in the direction of the positions of the articulated joints 10 of the deformed frame 20. The struts 11 are, by way of example, of self-deformable design and to this end each have, according to the example, at least one substantially stiff region 24 and at least one flexible region 23, where these regions differ, according to the example, by way of their cross-sectional geometry. The frame 9 assumes its compressed state 20, by way of example, in the event of a crash or an excessively strong action of force, as a result of which the frame deforms plastically and in this way ensures personal protection, in particular protection of a person's head that collides or can collide with the covering.

The invention claimed is:

1. A sound emission arrangement, having a seating means that has a backrest surface and a headrest surface, where the sound emission arrangement has at least one first and one second actuator for vibration excitation, where each of the two actuators is arranged in the seating means, so that an excitation surface of each of the first and the second actuator is arranged on an inner side of a covering of the headrest surface or an inner side of a covering of the backrest surface at substantially a same height,
wherein the excitation surface is positioned on the covering and/or is connected to the covering by a transfer element arranged between the excitation surface and the covering,
wherein the transfer element is configured both in terms of its shape and also in terms of its mechanical vibration properties, in respect of its stiffness and/or damping, such that the transfer element acts as an impedance transducer, and
wherein the first and the second actuator are formed such that the actuator excites or can excite its excitation surface and therefore a connected body to vibrate its body structure, as a result of which the body, which is at least partially surrounded by air, emits sound waves.

2. A sound emission arrangement, comprising:
a seating means that has a backrest surface and a headrest surface,
at least one first and one second actuator for vibration excitation, where two of the at least first and second actuators is arranged in the seating means, so that the first and the second actuator are each arranged with an excitation surface of each of the first and the second actuator on an inner side of a covering of the headrest surface or an inner side of a covering of the backrest surface at substantially a same height,
wherein the actuators each have an open frame formed from struts ow-adjacent a rear side of the actuators which is averted from the excitation surface, said frame enclosing the respective actuator with a spacing and projecting beyond the rear side of said actuator and said frame being of flexible and/or deformable configuration.

3. The sound emission arrangement as claimed in claim 2, wherein the excitation surface is positioned on the covering and/or is connected to the covering by a transfer element arranged between them.

4. The sound emission arrangement as claimed in claim 1, wherein the actuators are each arranged in a manner oriented substantially normally to the covering surface, where the covering surface is of curved configuration.

5. The sound emission arrangement as claimed in claim 1, wherein the seating means has an additional bass actuator, configured for reproducing/exciting frequencies of substantially less than 200 Hz and this additional bass actuator is arranged on the inner side of the covering of the backrest surface or on the inner side of the covering of a sitting surface or on the seating means structure in the region of the sitting surface or backrest surface.

6. The sound emission arrangement as claimed in claim 3, wherein the excitation surface is positioned directly on the covering and/or connected directly to said covering.

7. The sound emission arrangement as claimed in claim 6, wherein the frame is of deformable configuration in a direction normal to the excitation surface and also is likewise of deformable configuration perpendicular to said excitation surface.

8. The sound emission arrangement as claimed in claim 6, wherein the actuators, including the frame in each case, are each mounted/loosely mounted in a flexible filler material in the seating means and are each connected at the front, on sides of the excitation surface of the actuator, to the transfer element and/or to the covering.

9. The sound emission arrangement as claimed in claim 1, wherein the transfer element has a first thickness at a first end of the transfer element and a second thickness at a second end of the transfer element, the first thickness being greater than the second thickness.

10. The sound emission arrangement as claimed in claim 3, wherein the transfer element has a first thickness at a first end of the transfer element and a second thickness at a second end of the transfer element, the first thickness being greater than the second thickness.

11. The sound emission arrangement as claimed in claim 6, wherein the frame comprises articulated joints.

\* \* \* \* \*